ns patent Office 3,247,128
Patented Apr. 19, 1966

3,247,128
REGENERATION OF CATALYSTS
Peter Thomas White and Thomas Campbell O'May, Sunbury-on-Thames, Middlesex, England, assignors to The British Petroleum Company Limited, London, England, a British joint-stock corporation
No Drawing. Filed Sept. 18, 1962, Ser. No. 224,531
9 Claims. (Cl. 252—415)

This invention is concerned with the regeneration of catalysts used for the low temperature conversion of petroleum hydrocarbons, particularly the low temperature isomerization of $C_4$ and higher paraffin hydrocarbons boiling in the gasoline boiling range (i.e. up to 200° C.). The term "low temperature" means a temperature below 400° F. (204° C.).

The low temperature conversion of petroleum hydrocarbons, particularly the low temperature isomerization of $C_4$ and higher paraffin hydrocarbons boiling in the gasoline boiling range can be carried out with certain catalysts containing an inorganic oxide, which is preferably alumina, a platinum group metal and chlorine, the chlorine being added to the catalyst either as a Friedel-Crafts metal chloride, for example aluminium chloride, or by reacting the alumina with a compound of general formula

where X, when a nonvalent radical, is selected from the group consisting of H, Cl, Br and SCl, where Y, when a monovalent radical, is selected from the group consisting of H, Cl, Br and SCl, and where X and Y when they together form a divalent radical, is selected from the class consisting of O and S under non-reducing conditions and at a temperature such that chlorine is taken up by the alumina without the production of free aluminium chloride.

The preparation of the second type of catalysts is claimed in copending U.S. patent application Serial No. 135,426, filed September 1, 1961, and their use for low temperature isomerization is claimed in copending U.S. patent application Serial No. 135,425, filed September 1, 1961. Both types of catalyst gradually lose activity and, being high cost materials, a considerable economy in the cost of the isomerization process would be obtained if a method of regenerating the catalysts was available.

It will be apparent, however, that the two types of catalyst differ significiently in their preparation. In the first type, active catalyst sites are formed by the addition of bot aluminium and chlorine, and in the second by the addition of chlorine only. This affects the ability of the catalysts to be regenerated, and regeneration of catalysts of the first type presents considerable difficulties. It has now been found, however, that catalysts of the second type can be regenerated.

According to the present invention, therefore, a method of regenerating a catalyst which has been prepared by reacting a halogenatable inorganic oxide with a compound of general formula

where X, when a monovalent radical, is selected from the group consisting of H, Cl, Br and SCl, where Y, when a monovalent radical, is selected from the group consisting of H, Cl, Br and SCl, and where X and Y when they together form a divalent radical, is selected from the class consisting of O and S under non-reducing conditions and at a temperature such that chlorine is taken up by the oxide without the production of free chloride and which has become deactivated during a low-temperature conversion process, particularly a low temperature isomerization process as hereinbefore defined, comprises contacting the catalyst at an elevated temperature with an oxygen-containing gas and thereafter contacting the catalyst with a compound and under the conditions given above.

Platinum-alumina-halogen catalysts and known and are used for high temperature reforming or isomerization processes. It is also known that such catalysts may be regenerated, but both the present catalysts and the regeneration technique are different for the following reasons. In the first place the conventional high temperature reforming catalysts are not active for low temperature isomerization, the low temperature activity being the result of the particular form in which the chlorine is present. Secondly either oxidation alone or rehalogenation alone of high temperature reforming catalysts normally results in a considerable improvement in catalyst activity, whereas it has been found that the use of either step alone has no beneficial effect on the catalysts used in the present invention.

The inorganic oxide besides being halogenatable should also clearly have the desired physical characteristics to render it suitable as a hydrocarbon conversion catalyst. It is preferably a refractory oxide selected from Groups II to V of the Periodic Table, for example silica, titania, beryllia, boria, zirconia or magnesia. Mixtures of two or more oxides may be used if desired, preferred catalysts containing alumina or mixtures of alumina with up to 50% wt. of one or more of the other oxides referred to above. For convenience, the invention will be described with reference to the preferred inorganic oxide, alumina. Any convenient form of alumina may be used but preferably it is one of the forms known to be suitable as a base for catalysts used in the catalytic reforming of petroleum hydrocarbons. In these bases, the alumina is commonly gamma-alumina, eta-alumina or a mixture of these, with possibly some amorphous alumina.

A particularly preferred form is one derived from an alumina hydrate precursor in which the trihydrate predominates. One containing a major proportion of β-alumina trihydrate is particularly suitable. A convenient method of preparing the alumina is by hydrolysis of an aluminium alcoholate, for example aluminium isopropoxide, in an inert hydrocarbon solvent, for example, benzene. Other things being equal, the greater the amount of chlorine taken up by the alumina, the greater the activity of the catalyst and since, the maximum amount of chlorine which can be added is related to the surface area, it is desirable that the alumina should have a high surface area, for example more than 250 m.$^2$/g. and preferably more than 300 m.$^2$/g.

Preferably the alumina contains a minor proportion, for example, less than 25% wt. of a metal or metal compound having hydrogenating activity selected from Groups VIa and VIII of the Periodic Table. The preferred metal is a platinum group metal which may be present in an amount from 0.01 to 5% wt. and preferably 0.1 to 2% wt. The preferred platinum group metals are platinum and palladium.

When the catalyst has shown signs of deactivation and it is considered necessary to regenerate the catalyst, the flow of feedstock is stopped and the catalyst bed is purged to remove reactants. This may conveniently be done with inert gas, for example nitrogen, flue gas from an inert gas generator, or hydrogen. Hydrogen is preferred particularly when it is normally passed through the reaction zone during processing, the purge step then being simply carried out by stopping the flow of feedstock while continuing to pass the hydrogen. The temperature of the purge stage may conveniently be that of the processing, i.e. below 400° F. (204° C.). The rate of flow of the inert gas and the length of time necessary to give adequate purging may readily be determined, for example, by analysing the purge gas issuing from the reaction zone, suitable ranges being, for example, from 100 to 1,000 volumes of gas/volume of catalyst/hour or more for periods of from 10 minutes to 12 hours. The pressure used is not critical and it may be the same as that used during processing. However since the subsequent treatment with an oxygen containing gas will normally be carried out at atmospheric pressure, it will be necessary, when the processing is carried out at elevated pressure, to reduce the pressure and it may be convenient to do this before or during the purge stage.

The simultaneous presence of hydrogen and oxygen during the regeneration would clearly be undesirable. If, therefore, the purge is carried out with hydrogen, the hydrogen should be removed, for example by displacement with an inert gas, prior to the introduction of the oxygen containing gas.

The treatment with an oxygen-containing gas (hereinafter referred to, for convenience, as the "burn-off") should clearly be carried out at a temperature and under conditions such that damage to the catalyst is avoided, (for example conversion of the alumina of the catalyst to α-alumina, or crystallization of the platinum group metal when present) and a convenient overall range is 250 to 1200° F. The preferred temperature range for the burn-off is 400 to 1000° F., and more particularly 400 to 900° F. The length of time of the burn-off may be from 2 to 48 hours. If desired the burn-off can be carried out with a gradual or stepwise increase in temperature within the range 400 to 1000° F. over a period of 5 to 20 hours.

The oxygen-containing gas may be oxygen or air, but since the oxygen content of the gas is a factor in the rate and form of the burning and the temperature reached, the oxygen or air is preferably diluted with an inert gas, for example nitrogen. A convenient gas mixture would be one containing from 0.1 to 5% vol. oxygen, the precise quantity of oxygen and rate of flow being regulated to give temperatures within the ranges stated above.

The re-chlorination of the oxygen treated catalyst may be carried out in a manner similar to the chlorination of the original catalyst preparation, details of which have been given in copending U.S. patent application Serial No. 135,426, filed September 1, 1961, and will, for convenience, be set out again below.

A particular feature of the chlorination is the use of the specific compounds of the general formula indicated, these compounds giving a specific form of chlorination which produces active low temperature conversion catalysts. The following examples of compounds giving active and inactive catalysts respectively illustrate the specific nature of the compounds used.

Compounds giving active catalysts:
    Carbon tetrachloride ($CCl_4$)
    Chloroform ($CHCl_3$)
    Methylene chloride ($CH_2Cl_2$)
    Trichlorobromomethane ($CCl_3Br$)
    Thiocarbonyl tetrachloride ($CCl_3SCl$)
Compounds giving inactive catalysts:
    Hydrogen chloride (HCl)
    Chlorine ($Cl_2$)
    Methyl chloride ($CH_3Cl$)
    Acetyl chloride ($CH_3COCl$)
    Dichloroethane ($CH_2Cl$—$CH_2Cl$)
    Tetrachloroethane ($CHCl_2$—$CHCl_2$)
    Tetrachloroethylene ($CCl_2$=$CCl$)

In the case of compounds containing elements other than chlorine, carbon and hydrogen, the treatment may add the other elements to the catalyst in addition to the chlorine. For example treatment with results in the uptake of both chlorine and bromine onto the catalyst. It has been found, however, that catalysts so prepared are still active for low temperature conversion, and they may have, in addition, other properties resulting from the addition of the other elements. The preferred compounds giving active catalysts are carbon tetrachloride, chloroform and methylene chloride.

The compounds covered by the general formula in which X and Y together are O or S are phosgene and thiophosgene.

The non-reducing conditions used for the chlorination may be either inert or oxidising conditions, the latter being preferred since they give catalysts which lose activity more slowly during low temperature isomerization. A convenient method of contacting the alumina is to pass a gaseous stream of the chlorine compound over the alumina either alone or, preferably, in a non-reducing carrier gas. Examples of suitable carrier gases are nitrogen, air or oxygen.

Non-reducing conditions are essential, since reducing conditions tend to convert the chlorine compound to hydrogen chloride, which gives an inactive catalyst. The temperature for the chlorination may be 300–1100° F. (149–593° C.). The tendency to form free aluminium chloride increases with temperature and care should, therefore, be exercised when using the higher temperatures within the stated range. Since the temperatures used will normally be above the volatilisation temperature of aluminium chloride the formation of free aluminium chloride is readily detected by its appearance in the gaseous reaction products. When treating a platinum group metal-alumina composite, care should also be exercised to prevent the formation of volatile platinum complexes, the tendency for the formation of such complexes again increasing with increasing temperature. When treating platinum group metal-alumina composite the temperature is preferably 300–700° F. (149–371° C.), platinum-on-alumina composites being more particularly treated at 450–600° F. (232–316° C.) and palladium-alumina composites at 500–650° F. (260–343° C.). The chlorination reaction is exothermic and the temperatures specified are the initial temperatures used, but preferably the reaction is controlled in the manner indicated below so that the maximum temperature does not exceed 700° F., particularly not more than 650° F.

The rate of addition of the chlorine compound is preferably as low as practicable to ensure uniform chlorination and to avoid a rapid increase of temperature as a result of the exothermic reaction. Preferably the addition rate does not exceed 1.3% wt. of chlorine compound by weight of catalyst per minute. If a carrier gas is used the rate of flow is preferably at least 200 volumes/volume of catalyst/hour and a convenient range is 200–1000 v./v./hr. The pressure used is conveniently atmospheric.

The amount of chlorine taken up by the catalyst will depend on the same considerations as apply during the catalyst preparation, the amount of chlorine which can be added without the formation of free aluminium chloride being related to the surface area of the catalyst and being about $3.0–3.5 \times 10^{-4}$ g./sq. metre of the original catalyst surface area. Maximum chlorination is preferred but lower amounts of chlorine still give active catalysts and a suitable range is, therefore, from $2.0 \times 10^{-4}$ to $3.5 \times 10^{-4}$ g./m.$^2$. The burn-off treatment is likely to have removed a considerable amount of the original chlorine, and in practice amounts of up to 50% wt. of chlorinating compound by weight of catalyst used may be passed over the catalyst during the chlorination. Control of the reaction and an indication of when the reaction is complete may be obtained by, for example, the use of thermocouples to measure the temperature rise caused by the exothermic reaction and/or by analysis of the gases issuing from the reaction zone.

Preferably the re-chlorinated catalyst is calcined before reuse in a manner similar to that described in copending U.S. patent application Serial No. 216,314, filed August 13, 1962.

The various steps in the regeneration process together with the preferred conditions can be summarized in the following Table I.

TABLE 1

| Stage | Gas | Preferred temperature range, °F. | Remarks |
|---|---|---|---|
| Pre-burn off | Hydrogen | 150–350 | Purge to remove reactants. Pressure reduced to atmospheric. |
| Burn-off | Inert gas with controlled oxygen content. | >900 | Temperature controlled by oxygen content of gas. |
| Rechlorination | Air and CCl$_4$ | 450–600 | Chlorination temperature controlled by CCl$_4$ injection, not exceeding 650° F. Total CCl$_4$ injected up to 50% catalyst weight. |
| Calcination | Air | >900 | Temperature raised to 900° F. under air flow and then cooled back to 150–350° F. |

The present invention is particularly suitable for use in combination with a process for the low temperature isomerization of C$_4$ and higher paraffin hydrocarbons boiling in the gasoline boiling range, the catalyst being regenerated as described above and thereafter reused in the low temperature isomerization process.

When the process is one of low-temperature isomerization, the feedstock of the process is preferably one containing a major proportion of pentanes, hexanes or a mixture of these paraffins. A feedstock containing a major proportion of hexanes is particularly preferred. If it is desired to isomerize normal paraffins only, the feedstock may first be treated to separate normal paraffins from the other hydrocarbons and the normal paraffins contacted with the isomerization catalyst. Such separation may conveniently be effected by means of the so-called molecular sieves.

The product of the isomerization reaction may similarly be treated to recover unconverted normal paraffins which may be re-cycled to the isomerization reaction zone. Such separation may also conveniently be effected by means of the so-called molecular sieves.

The feedstock is advantageously free of sulphur, water and aromatic hydrocarbons.

The isomerization may be carried out under the following conditions, in either liquid or vapor phase.

Temperature, 50–400° F., preferably 150–350.
Pressure, Atmospheric–2000 p.s.i.g., preferably 225–1000.
Space velocity, 0.05–10 v./v./hr. preferably 0.2–5.
Hydrogen:hydrogen mole ratio 0.01–20:1, preferably 1.5–15:1.

If desired a hydrogen halide, particularly hydrogen chloride, or a compound giving rise to it under the reaction conditions may be added to the reaction zone, either directly or by addition to the feedstock or hydrogen-containing gas used. The hydrogen halide is preferably present in an amount up to 1% by weight of feedstock.

The invention is illustrated by the following examples.

Example 1

(1) *Preparation of fresh catalyst A.*—125 ml. of a commercial platinum alumina composite, consisting of 0.57 percent weight platinum and 0.81% weight chlorine on alumina, were charged to a glass reactor and treated in the following way:

(a) the catalyst composite was dried in a nitrogen flow at 500° C. for 2 hours. The gas hourly space velocity was 500 v./v./hr. throughout the treatment, downward flow operation being employed.

(b) the catalyst composite was treated with 24 percent weight (based on weight of catalyst charged) of carbon tetrachloride at 500° F. The CCl$_4$ was added dropwise into the nitrogen carrier gas stream above the catalyst bed, the vaporized CCl$_4$ being carried over the catalyst by the nitrogen carrier gas. The addition rate of CCl$_4$ was not allowed to exceed 0.8 g./min.

(c) the treated catalyst was flushed with nitrogen at 500° F. for a further hour and then discharged to a dry, air-tight container. This catalyst was designated Catalyst A.

(ii) *Use and deactivation of Catalyst A.*—Four 30 ml. samples of the above Catalyst A were activity tested for low temperature hexane isomerization under the following conditions:

Temperature, °F. ------------------------------- 270
Pressure, p.s.i.g. ------------------------------ 250
H$_2$:HC mol ratio ------------------------------ 2.5:1
Liquid hour space velocity, v./v./hr. ---------- 2.0

The feedstock was a desulphurised, dearomatized C$_6$ cut from a refinery light gasoline and contained 0.1 percent weight CCl$_4$ as additive. The average length of run was 50 hours on steam, while the initial conversion of 18 percent 2.2-dimethylbutane in the unstabilized liquid product dropped to an average of 12.5 percent weight at 50 HOS. The spent catalyst particles were purged for 1 hour at 270° F. with hydrogen and cooled to room temperature under nitrogen. They were discharged to a common, dry, air-tight container and thoroughly mixed to ensure uniformity. This catalyst was designated Catalyst B.

(iii) *Preparation of Catalyst C.*—One 30 ml. charge of Catalyst B was charged to a glass reactor and treated with 14 percent weight CCl$_4$ (based on weight of catalyst) exactly as described for the preparation of Catalyst A. This catalyst was designated Catalyst C.

(iv) *Preparation of Catalyst D.*—One 30 ml. charge of Catalyst B was heated in steps up to 930° F. in air. The temperature was brought up to 500° F. in 2 hours, increased by 100° F. each hour up to a temperature of 930° F. and then held at 930° F. for 2 hours.

(v) *Preparation of Catalyst E.*—One 30 ml. charge of Catalyst B was heated in steps up to 930° F. in air exactly as described for Catalyst D. The catalyst was then charged to a glass reactor and treated with 14 percent weight CCl$_4$ exactly as described for Catalyst A. This catalyst was designated Catalyst E.

(vi) *Activity Tests.*—Small portions of catalysts B, C, D and E were analysed for chlorine and carbon content. The remaining portions were then activity tested for the low temperature isomerization of hexane under the same conditions and using the same feedstock as described under (ii) above. The results of the activity tests are summarized in Table 2 below and compared with the results obtained with the fresh catalyst A.

TABLE 2

| Catalyst | Chlorine, percent wt. | Carbon, percent wt. | Activity test results Conversion to 2,2-dimethylbutane, percent wt. | | |
|---|---|---|---|---|---|
| | | | Initial (at 6 HOS) | 21 HOS | 50 HOS |
| A | 11.2 | 0.02 | 18 | 15.5 | 12.5 |
| B | 9.5 | 1.13 | 9 | 7 | |
| C | 10.4 | 0.78 | 8 | | |
| D | 3.1 | 0.02 | 4 | | |
| E | 10.5 | 0.02 | 17 | 16 | |

The data on chlorine and carbon contents showed that the deactivated catalyst B had a reduced chlorine content and a considerable carbon content as compared with fresh catalyst A. Re-chlorination to give catalyst C increased the chlorine content but reduced the carbon content to a limited extent only. Heating in air to give catalyst D resulted in the removal of the carbon but also removal of the chlorine.

Only catalyst E which had been heated in air to remove carbon and then re-chlorinated, had chlorine and carbon contents similar to that of the fresh catalyst A.

The activity test on Catalyst B showed that the deactivation was permanent, and that further deactivation occurred with further use for isomerization. The tests on catalyst C which had been rechlorinated but not heated in air and on catalyst D which had been heated in air but not rechlorinated show that neither treatment had any appreciable effect on catalyst activity. When the treatments were combined as in catalyst E however, the catalyst was restored to its initial activity.

*Example 2*

(i) *Preparation of Catalyst F.*—65 g. of a platinum-alumina-halogen composite, containing 0.57 percent weight platinum and 0.81 percent weight chlorine on alumina, were charged to a vertical, tubular glass reactor, and a dry nitrogen flow of 48 liters/hour was passed down-flow over the catalyst. The temperature of the catalyst was raised to and maintained at 550° F.

After 2 hours, carbon tetrachloride was injected into the nitrogen stream at the rate of 13 g./hour, the vapour being carried over the catalyst bed. After 2 hours, when 26.2 g. carbon tetrachloride had passed over the catalyst, injection was discontinued, and after a further hour's purging with nitrogen at 550° F., the catalyst was cooled to room temperature, and quickly discharged to a dry, air-tight container. An increase in catalyst weight of 6.9 percent was observed and the catalyst had the following analysis Chlorine, percent wt. _____ 13.3
Carbon, percent wt. _____ 0.02
Hydrogen, percent wt. _____ 0.05
Surface area, m.²/g. _____ 327
Pore volume, ml./g. _____ 0.29

(ii) *Use and regeneration of Catalyst F.*—25 g. of catalyst F were charged to a reactor and activity tested under the following conditions:

270° F.
250 p.s.i.g.
2.5:1 hydrogen:hydrocarbon mol ratio.
1.0 v./v./hr. liquid hourly space velocity.

The feedstocks used and results obtained are given in Table 3 below. At 66 hours on stream the catalyst was regenerated by the following method:

The reactor was purged for 1 hour with hydrogen, and the pressure was then reduced to atmospheric. After flushing the system with nitrogen, an air flow of 15 liters/hour was established. The temperature was carefully raised to avoid "runaway" burning according to the following procedure:

Hours
(a) 270°–400° F. _____ 3¼
(b) 400°–450° F. _____ 1
(c) 450°–500° F. _____ 1
(d) 500°–900° F. _____ 4¼
(e) 900° F. _____ 1

Particular care was exercised in the temperature region 400°–500° F. as the onset of detectable "burning" occurred in this range. The catalyst was cooled to 550° F. under air flow, and then treated with 8.4 g. carbon tetrachloride (32.3 percent weight of the catalyst) in 1 hour. A maximum catalyst temperature of 575° F. was recorded 7 minutes after carbon tetrachloride treatment commenced.

After the completion of the carbon tetrachloride addition, the catalyst temperature was raised to 900° F. in the same way as for steps (d) and (e) above, under a 15 liter/hour air flow, and then finally cooled back to 270° F. After flushing with nitrogen, activity test conditions were re-established.

TABLE 3

| Hours on stream | Feedstock 1 plus 0.1% wt. CCl₄ | 6 HOS | 39 HOS | Feedstock 2 plus 0.1% wt. CCl₄ | 49 HOS | 66 HOS | Regeneration | | |
|---|---|---|---|---|---|---|---|---|---|
| | | | | | | | Feedstock 3 plus 0.1% wt. CCl₄ | 72 HOS | 108 HOS |
| Component, percent wt.: | | | | | | | | | |
| Propane | | Trace | Trace | | 1 | Trace | | Trace | Trace |
| Isobutane | | 0.5 | 0.5 | | 2 | 0.5 | | 0.5 | 0.5 |
| n-Butane | Trace | Trace | Trace | | Trace | Trace | Trace | Trace | Trace |
| Iso-pentane | Trace | 2.5 | 2.5 | Trace | 1 | Trace | Trace | 1 | 1 |
| n-Pentane | 4.5 | 1.5 | 1.5 | 1.5 | 1 | 1 | 1.5 | 0.5 | 1 |
| 2,2-dimethylbutane | 3.5 | 24 | 23.5 | 0.5 | 10.5 | 1 | 2.5 | 28.5 | 0.53 |
| 2,3-dimethylbutane | } 33.5 | 40.5 | 40.5 | 25.5 | 36 | 30.5 | 39 | 40 | 29 |
| 2-methylpentane | | | | | | | | | 39 |
| 3-methylpentane | 23 | 15.5 | 16 | 16 | 15 | 12.5 | 22.5 | 15.5 | 15.5 |
| n-Hexane | 30 | 11 | 11 | 31 | 15 | 20 | 30 | 10 | 10.5 |
| C₆ naphthenes | 5.5 | 4.5 | 4.5 | 13.5 | 12.5 | 15 | 4.5 | 4 | 4 |
| Benzene | Nil | | | 0.5 | Trace | 0.5 | Nil | | |
| C₇ etc. | | | | 11.5 | 6 | 10 | | | |
| Sulphur (p.p.m.) | 0.6 | | | 250 | | | 0.7 | | |

The results given in Table 3 showed that initially, when the feedstock contained little or no benzene, C₇ and higher hydrocarbons, and sulphur satisfactory operation was obtained. When the feedstock was altered to include these components the catalyst activity dropped sharply. On regenerating the catalyst and reverting to the original feedstock the catalyst activity was fully restored, however.

We claim:
1. A method of regenerating a catalyst which has been prepared by reacting a halogenatable refractory inorganic oxide selected from the group consisting of alumina, silica, titania, beryllia, boria, zirconia and magnesia with a compound of general formula

where X, when a monovalent radical, is selected from the group consisting of H, Cl, Br and SCl, where Y, when a monovalent radical, is selected from the group consisting of H, Cl, Br and SCl, and where X and Y when they together form a divalent radical, is selected from the class consisting of O and S under non-reducing conditions and at a temperature in the range of 300 to 1100° F. such that chlorine is taken up by the oxide without the production of free chloride, the resulting catalyst containing from $2.0 \times 10^{-4}$ to $3.5 \times 10^{-4}$ g. of chlorine/sq. meter of surface area and which has become deactivated during a low temperature conversion process, comprising contacting in the catalyst at an elevated temperature in the range of 250 to 1200° F. with a free oxygen-containing gas and thereafter rechlorinating the catalyst by contacting the catalyst with a compound of the general formula given above under the conditions given above, the resulting regenerated catalyst containing from $2.0 \times 10^{-4}$ to $3.5 \times 10^{-4}$ g. of chlorine/sq. meter of surface area.

2. A method as claimed in claim 1 wherein the halogenatable inorganic oxide is selected from the group consisting of alumina and mixtures of alumina with up to 50% wt. of at least one other oxide selected from the group consisting of silica, titania, beryllia, boria, zirconia and magnesia.

3. A method as claimed in claim 1 wherein the catalyst contains a minor proportion of a metal having hydrogenating activity selected from Groups VIa and VIII of the Periodic Table.

4. A method as claimed in claim 3 wherein the catalyst contains from 0.01 to 5% wt. of a platinum group metal.

5. A method as claimed in claim 1 wherein the temperature is from 400 to 1000° F.

6. A method as claimed in claim 1 wherein the oxygen containing gas contains from 0.1 to 5% volume of oxygen.

7. A method as claimed in claim 1, wherein the rechlorination is carried out with a non-reducing carrier gas for the chlorine compound.

8. A method as claimed in claim 1 wherein the catalyst contains a platinum group metal and the temperature is from 300 to 700° F.

9. A method as claimed in claim 1 wherein the chlorine containing compound is carbon tetrachloride.

References Cited by the Examiner
UNITED STATES PATENTS

| | | | |
|---|---|---|---|
| 2,481,253 | 9/1949 | Snyder | 252—415 |
| 2,642,384 | 6/1953 | Cox | 252 |
| 2,963,445 | 12/1960 | Nixon | 252—415 |

FOREIGN PATENTS

| | | |
|---|---|---|
| 167,797 | 5/1954 | Australia. |
| 280,712 | 11/1927 | Great Britain. |
| 772,872 | 4/1957 | Great Britain. |

MAURICE A. BRINDISI, *Primary Examiner.*